Patented Jan. 9, 1940

2,186,389

UNITED STATES PATENT OFFICE 2,186,389

VAT DYESTUFFS AND THEIR LEUCO ESTERS

Heinrich Neresheimer, Ludwigshafen-on-the-Rhine, Ernst Honold, Frankfort-on-the-Main, Berthold Stein, Ludwigshafen-on-the-Rhine, Max Schubert, Frankfort-on-the-Main, and Ernst Anton, Ludwigshafen-on-the-Rhine, Germany, assignors to General Aniline Works, Inc., New York, N. Y., a corporation of Delaware No Drawing. Application August 30, 1938, Serial No. 227,526. In Germany September 2, 1937

8 Claims. (Cl. 260—192)

The present invention relates to new vat dyestuffs and their leuco esters.

We have found that valuable new vat dyestuffs are obtained by treating aryl derivatives of the anthraquinone series containing an amino group in the aryl radicle with oxidizing agents. The aryl radicle may be, for example, a radicle of the benzene, naphthalene or diphenyl series. The treatment may be carried out in an acid medium, as for example with chromic acid or chromates, or also in an alkaline or neutral liquid, as for example with aqueous alkali hypochlorite or bromite solutions. Nitrous acid or substances yielding the same are unsuitable for the oxidation because diazotization takes place.

The aminoarylanthraquinones may also contain any other atoms or groups and also attached rings, as for example pyridine rings. The expression "anthraquinone series" therefore includes in general compounds containing the characteristic part of anthraquinone but which may also contain any rings in the alpha-beta or beta-beta positions.

The new dyestuffs are distinguished by high fastness, in particular by an excellent fastness to light. Their solutions in sulphuric acid have a deeper coloration than those of the initial materials. They are usually soluble with difficulty in organic solvents.

The said vat dyestuffs may also be obtained by starting, instead of from aryl derivatives containing an amino group on the aryl radicle, from aryl derivatives of the anthraquinone series containing the nitrogen on the aryl radicle in a lower stage of oxidation than in the azo linkage and oxidizing the same, or by starting from aryl derivatives of the anthraquinone series containing nitrogen in the aryl radicle in a higher stage of oxidation than in the azo linkage and then reducing to the corresponding azo compounds, or by treating azoaryl-aroylbenzoic acids with condensing agents, or by oxidizing dianthrylazo hydrocarbons of the aryl series which have on the ms-carbon atoms of the anthryl groups a lower stage of oxidation than anthraquinonyl.

As oxidizing agents for aryl derivatives of the anthraquinone series which contain nitrogen in the aryl radicle in a lower stage of oxidation than in the azo linkage, as for example for the oxidation of aryl derivatives containing hydrazo groups, there may be mentioned for example chromic acid, manganic acid, permanganic acid, hypochlorous acid and hypobromous acid. They may be allowed to act in acid, neutral or alkaline media. The oxidation may also be effected intramolecularly. In this way there is obtained from the hydrazo compound by disproportionation the azo compound and also the aminoaryl compound.

For the reduction of aryl derivatives of the anthraquinone series which contain nitrogen in the aryl radicle in a higher stage of oxidation than the azo linkage, for example for the reduction of a nitro, nitroso, diazo or azoxy group, there may be used for example alkali sulphides, stannous chloride or dextrose in alkaline solution, or also ammoniacal cuprous oxide solution or sulphurous acid or its salts depending on the nature of the initial materials.

For the conversion of azoarylaroylbenzoic acids into the vat dyestuffs there may be used for example sulphuric acid, phosphoric acid, zinc chloride or alkyl sulphuric acids.

The dianthrylazo hydrocarbons of the aryl series which have on the ms-carbon atoms of the anthryl group a lower stage of oxidation than anthraquinonyl may be oxidized in neutral, alkaline or acid media depending on the stage of oxidation of the initial material. Thus for example chromic acid in acid medium may be used for the oxidation of the anthracene stage, and for the oxidation of the anthrahydroquinone stage, which may also be present in the form of an ether or ester, there may be used nitrous acid, chromic acid, iron chloride, hypohalites and the like. Esters of the anthrahydroquinone stage may also be oxidized on the fibers to the vat dyestuffs.

By treating the dyestuffs in the presence of a tertiary base with metals and derivatives of sulphuric acid having an esterifying action, they may be converted into leuco sulphuric esters. The said leuco sulphuric esters thus obtainable crystallize in the form of the alkali salts or their salts with organic bases in an excellent manner and have good solubility in water. They have an excellent affinity for fibers and yield very powerful dyeings of excellent fastness by development in the usual manner.

The leuco-tetrasulphuric acid esters may also be obtained by converting leuco sulphuric acid esters of aryl derivatives of compounds of the anthraquinone series which contain the nitrogen on the aryl radicle in a lower stage of oxidation than in the azo linkage by oxidation, or leuco sulphuric acid esters of aryl derivatives of compounds of the anthraquinone series which contain the nitrogen on the aryl radicle in a higher stage of oxidation than in the azo linkage by reduction, into leuco-tetrasulphuric acid esters of the corresponding azo compounds.

As oxidizing agents for the conversion of leuco sulphuric acid esters of derivatives of arylanthraquinones containing the nitrogen in the aryl radicle in a lower stage of oxidation than in the azo linkage, as for example for the oxidation of an amino or hydrazo group present on the aryl radicle, there may be mentioned in particular hypohalites, alkali ferricyanides and peroxides.

For the reduction of leuco sulphuric acid esters of aryl derivatives of compounds of the anthraquinone series which contain the nitrogen in the aryl radicle in a higher stage of oxidation than in the azo linkage, as for example for the reduction of a nitro, diazo or azoxy group attached to the aryl radicle, there may be used for example alkali sulphides, stannous chloride or dextrose in alkaline solution or also ammoniacal cuprous oxide or alkali sulphites depending on the nature of the initial materials.

The following examples will further illustrate how the said invention may be carried out in practice but the invention is not restricted to these examples. The parts are by weight.

*Example 1*

60 parts of 4'-amino-2-phenylanthraquinone are dissolved in 3000 parts of hot glacial acetic acid; a solution of 20 parts of chromic acid in 20 parts of water is then allowed to drop in. There separates, with boiling, a green-yellow compound which becomes paler upon further heating. After 15 minutes the dyestuff is filtered off by suction while hot and washed with glacial acetic acid and water. By crystallization from a large amount of nitrobenzene, large yellow needles are obtained which dissolve in sulphuric acid giving a bluish red coloration.

The new dyestuff yields powerful yellow dyeings of very good fastness on cotton from a yellow-red vat. According to analysis and its properties, the azo compound corresponding to the amino compound used is present.

*Example 2*

A solution of 45 parts of sodium bichromate in 25 parts of water is added in the manner described in Example 1 to a solution of 30 parts of 4'-amino-2-phenylanthraquinone in 1000 parts of boiling glacial acetic acid. After a short time fine yellow crystals are precipitated. The mixture is kept boiling for some time, filtered by suction while hot and the residue washed with glacial acetic acid and water and dried. The new compound may be separated from its solution in sulphuric acid by the addition of small amounts of water in the form of a red-brown sulphate which crystallizes in needles. It conforms in its properties with that of Example 1.

*Example 3*

30 parts of 4'-amino-2-phenylanthraquinone are suspended in a finely divided form in 1200 parts of water and treated at from 80° to 90° C. with 500 parts of sodium hypochlorite solution containing about 10 per cent of active chlorine. After some time the substance, which is then red-yellow, is filtered off by suction, dried and, after purification corresponding to that in Example 1 or 2, a compound is obtained which is identical with those of the said examples in its properties.

*Example 4*

A solution of 1.5 parts of chromic acid in 1 part of water is added to a solution of 3 parts of 4'-amino-2-phenyl-5.8.dichloranthraquinone in 1500 parts of hot glacial acetic acid. The deposited red-yellow substance is filtered off by suction while hot and washed with glacial acetic acid and water. By crystallization from a large amount of nitrobenzene yellow crystals are obtained which dye cotton yellow shades from a yellow-red vat and which dissolve in sulphuric acid giving a bluish red coloration.

*Example 5*

A sodium hypochlorite solution containing about 10 per cent of active chlorine is allowed to drop into a suspension of 30 parts of finely dispersed 4'-amino-2.6-diphenylanthraquinone (obtainable from 4-phenylphthalic anhydride and 4-acetaminodiphenyl according to Friedel-Crafts, ring closure to the anthraquinone derivative and saponification; red needles; the coloration of the solution in strong sulphuric acid is yellow-red) in 1200 parts of water at 60–70° C., until an excess of hypochlorite is detectable. The compound formed is filtered off by suction, washed until neutral and recrystallized from nitrobenzene, if desired. The new compound is a diphenyl derivative of the azo compound described in Example 1. It dissolves in strong sulphuric acid with a bluish red coloration and dyes cotton powerful yellow shades from a yellow-red vat.

*Example 6*

A solution of 5.5 parts of potassium permanganate in 150 parts of water is allowed to drop into a suspension of 15 parts of 4'-amino-2-phenylanthraquinone in 500 parts of water while stirring vigorously. When all permanganate is used up, the pyrolusite thus formed is dissolved with sulphurous acid and the remaining red-yellow substance is filtered off by suction and dried. It is recrystallized from nitrobenzene and is identical with the end product obtained according to the manner described in Example 1.

*Example 7*

30 parts of the amino-1-phenylanthraquinone (obtainable by nitration of 1-phenylanthraquinone and reduction with sodium sulphide; bluish red crystals; coloration of the solution in strong sulphuric acid is red-yellow) are dissolved in 1200 parts of boiling glacial acetic acid. Then a solution of 14 parts of chromic acid in 14 parts of water and 28 parts of glacial acetic acid is allowed to drop into the mixture. The brown compound thus formed is filtered off by suction, washed with glacial acetic acid and then with water and dried. By carefully adding water, the compound may be separated from its solution in sulphuric acid in the form of its red-brown, well crystallized sulphate. It dyes cotton from a yellow-red vat reddish yellow shades.

*Example 8*

75 parts of sodium hypochlorite solution containing 10 per cent of active chlorine are allowed to drop at from 60 to 70° C. into a suspension of 5 parts of 4'-amino-2-phenyl-5.8-dichloranthraquinone in 200 parts of water. The violet compound changes slowly to yellow-brown. The new compound may be purified by recrystallization from nitrobenzene as described in Example 4 or by adding water, to its solution in sulphuric acid giving a brown-yellow sulphate. It is identical in its properties with the compound described in Example 4.

*Example 9*

12 parts of 4-amino-4'-beta-anthraquinonyl-diphenyl (obtainable for example from 4-acetaminoterphenyl and phthalic anhydride according to Friedel-Crafts, ring closure to the anthraquinone derivative and saponification with sulphuric acid; yellow-red crystals; coloration of the solution in strong sulphuric acid is red-yellow) are dissolved in 120 parts of 96 per cent sulphuric acid. The solution is poured onto ice water, the precipitate filtered off by suction, washed until neutral, suspended in 1000 parts of water and treated at from 60 to 70° C. with 200 parts of sodium hypochlorite solution. The coloration changes from currant to reddish yellow. The new compound is separated in the usual manner and, if desired, purified by recrystallization from nitrobenzene or over its sulphate. It dissolves in sulphuric acid with blue-red coloration and dyes cotton from a yellow-red vat powerful yellow shades.

*Example 10*

5 parts of 4'-amino-2-phenyl-6-(or 7-)-chloranthraquinone (obtainable from 4-chlorphthalic anhydride and 4-acetaminodiphenyl by a Friedel-Crafts' synthesis, ring closure to the anthraquinone derivative and saponification with sulphuric acid; bluish red crystals; coloration of the solution in strong sulphuric acid is yellow-red) are treated in aqueous suspension with 75 parts of sodium hypochlorite solution at from 60 to 70° C. The brown-yellow compound thus formed may further be purified, if desired, by recrystallization from nitrobenzene. Cotton is dyed yellow shades from a yellow-red vat.

*Example 11*

A sodium hypochlorite solution containing 10 per cent of active chlorine is allowed to drop at 60° C. into a suspension of 20 parts of 4'-amino-2-phenyl-5.6(N)-(or -7(N).8-)-pyridinoanthraquinone (obtainable for example from quinoline-5.6-dicarboxylic acid anhydride, melting point at from 185 to 186° C.) and 4-acetaminodiphenyl by a Friedel-Crafts' synthesis, ring closure to the anthraquinone derivative and saponification; brown-red crystals; coloration of the solution in strong sulphuric acid is greenish yellow, coloration of the vat bluish red) in 1000 parts of water, until an excess of hypochlorite is detectable and the brown-red compound changes to yellow-red. It is filtered off by suction, washed until neutral and recrystallized, if desired, from dichlorbenzene. The new compound dissolves in concentrated sulphuric acid giving a strong blue-red coloration. According to analysis and properties it is the azo compound corresponding to the amino compound employed. It dyes cotton from a bluish red vat powerful golden-yellow shades.

*Example 12*

5 parts of a 50 per cent aqueous chromic acid solution are added to 50 parts of glacial acetic acid, the whole is heated to gentle boiling and there is introduced 1 part of dianthraquinonylhydrazobenzene of the formula

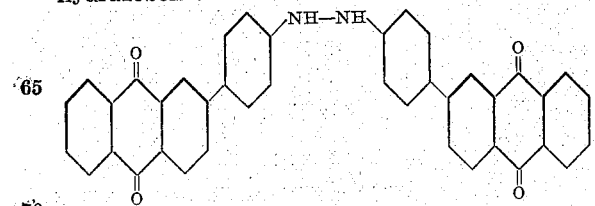

(obtainable for example from the corresponding dianthraquinonyl-azobenzene by treatment with phenylhydrazine at from 140 to 150° C.; large deep brown needles which dissolve in sulphuric acid giving a brown-red coloration). The whole is heated to boiling until the color of the initial material has changed to yellow without appreciable amounts of the same being dissolved and a sample of the filtered-off precipitate dissolves in sulphuric acid giving a blue-red coloration. The whole is then filtered by suction and washed with water. A yellow crystal powder is thus obtained having the properties of the azo compound described in Example 1.

*Example 13*

10 parts of the initial material used in Example 12 are heated in 250 parts of anhydrous commercial pyridine at from about 120 to 125° C. While the brown crystals of the initial material are still passing into solution, small yellow needles already begin to separate. As soon as initial material can no longer be detected by microscopic investigation, the whole is filtered by suction while hot and the solvent is removed from the filter cake in the usual manner. The final product thus obtained conforms in its properties with the azo dyestuff described in Example 1.

From the pyridine mother liquor, there separate upon standing small brownish crystals which consist substantially of 4'-amino-2-phenylanthraquinone.

*Example 14*

10 parts of 4'-nitro-2-phenylanthraquinone in a finely divided form are made into a paste with 500 parts of water; a solution of 17 parts of stannous chloride in 170 parts of 35 per cent caustic soda solution is allowed to flow into the same at 20° C. while stirring. The temperature rises slightly; the color changes from the original yellow to dirty grey-brown to yellow-red. After stirring for several hours at from 20 to 25° C., the whole is filtered by suction and washed until neutral. The dyestuff obtained is identical in its properties with that obtained according to Example 1.

*Example 15*

11 parts of 3'-nitro-2-phenylanthraquinone (obtainable for example from 4'-acetamino-2-phenylanthraquinone by nitration, saponification of the acetyl group and removal of the amino group) are suspended in a finely divided form in a solution of 8 parts of crystallized sodium sulphide in 200 parts of 60 per cent caustic soda solution and heated to 140° C. for 7 hours while stirring, whereby the original yellow particles become red-yellow. The whole is diluted with water, filtered by suction, washed until neutral and dried. A dyestuff which crystallizes in pale yellow needles from aniline is obtained which dyes cotton pale yellow shades from a red vat.

*Example 16*

10 parts of azobenzoylbenzoic acid of the formula

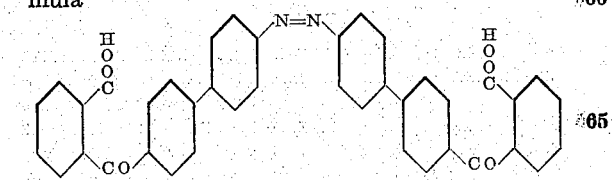

(obtainable from 4'-acetaminodiphenyl and phthalic anhydride by the process of Friedel-Crafts; saponification and oxidation with sodium hypochlorite to the corresponding azo compound) are dissolved in 100 parts of 5 per cent oleum and the solution is then heated for 3 hours at from 120 to 130° C. After cooling, the whole is poured onto ice, and the separated red-yellow precipitate is filtered off by suction, treated with dilute ammonia, washed until neutral and dried. A dyestuff is obtained which dissolves in sulphuric acid giving a bluish red coloration and which conforms in all its properties with the dyestuff described in Example 1.

*Example 17*

A solution of 10 parts of ferric chloride in 200 parts of 10 per cent sulphuric acid is added to a solution of 5 parts of the tetrasulphuric acid ester potassium salt described in Example 19 in 200 parts of water. By heating at from 50 to 60° C. there separates from the yellow-red reaction liquid a pale orange precipitate which, after no increase in the same can be observed, is filtered off by suction and washed until neutral. The dyestuff obtained conforms in its properties with the dyestuff described in Example 1. Sodium nitrite, chromic acid salts or hydrogen peroxide may also be used as oxidizing agents instead of ferric chloride.

*Example 18*

30 parts of azophenylbenzoyldichlorbenzoic acid of the following constitution

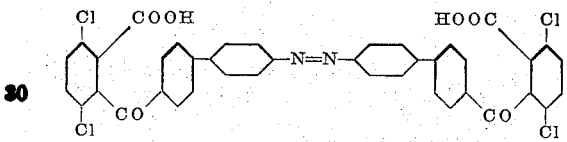

(obtainable for example from 4-acetaminodiphenyl and 3.6-dichlorphthalic anhydride by a Friedel-Crafts' synthesis, saponification of the acetaminophenylbenzoyldichlor benzoic acid to aminophenylbenzoyldichlor benzoic acid and oxidation with hypochlorite in alkaline solution; yellow-brown powder, coloration of the solution in strong sulphuric acid powerful blue-red) are heated with 600 parts of 5 per cent oleum for an hour at from 125 to 130° C. Then the mixture is poured onto ice, the precipitate is filtered off by suction, treated with dilute sodium hydroxide solution, washed until neutral and dried. The dyestuff thus obtained may be further purified by dissolving it in sulphuric acid and separating the sulphate. It corresponds in its properties to that described in Examples 4 and 8.

If instead of azophenylbenzoyldichlorbenzoic acid, azophenylbenzoylphenylbenzoic acid, (obtainable from 4-acetaminodiphenyl and 4-phenylphthalic anhydride by a Friedel-Crafts' synthesis; saponification of the acetaminophenylbenzoylphenylbenzoic acid to the aminophenylbenzoylphenylbenzoic acid and oxidation with hypochlorite; yellow-brown powder; coloration of the solution in alkali is yellow) is employed, a compound is obtained which conforms in all its properties with that described in Example 5.

*Example 19*

14 parts of the dyestuff obtainable according to Example 1 and 14 parts of copper meal are added to a mixture of 21 parts of chlorsulphonic acid and 200 parts of pyridine and the mixture is stirred for 5 hours at from 40 to 50° C., the dyestuff thus passing into solution with a red-yellow coloration. By introducing the mixture into ice, the pyridine salt of the leuco sulphuric ester separates as an oil. It is dissolved by stirring with 1000 parts of water and 50 parts of 60 per cent caustic potash solution, the copper removed by filtration by suction and the potassium salt of the leuco ester is precipitated from the yellow-red colored ester salt solution at 50° C. by the addition of 300 parts of potassium chloride. It forms beautiful yellow-red needles which are separated in the usual manner. It dyes cotton pale yellow shades; by development with an oxidizing agent, brilliant yellow dyeings of excellent fastness are obtained.

If the dyestuff obtainable according to Example 4 be used, the potassium salt of a leuco ester is obtained which yields on cotton after development yellow dyeings of similar properties. By using the dyestuff of Example 11, a leuco ester is obtained which dyes cotton yellow shades.

*Example 20*

18 parts of chlorsulphonic acid are allowed to drop into 140 parts of dry pyridine and into this mixture there is introduced at 40° C. a mixture of 9 parts of the dyestuff obtainable according to Example 1 and 15 parts of copper meal. After from 4 to 5 hours, all the dyestuff has passed into solution. The esterification mixture is introduced into ice-water, the separated oily pyridine salt is dissolved in a mixture of 50 parts of 60 per cent caustic potash solution and 300 parts of water, copper is removed by filtration by suction and air is led at 40° C. into the resulting blackish red solution until its color has changed to a brilliant yellow-red. 125 parts of potassium choride are then added, while stirring, whereby the ester salt is deposited as beautiful red-yellow needles. It conforms in its properties with the ester salt obtained according to Example 19.

*Example 21*

20 parts of azo-1-phenylanthraquinone (obtainable according to Example 7) and 30 parts of copper meal are added to a mixture of 27 parts of chlorsulphonic acid and 400 parts of pyridine and stirred at 40° C., until the dyestuff has passed into solution. By adding the mixture to 1200 parts of ice water, a viscous oil precipitates, which may be dissolved in 500 parts of 5 per cent potassium hydroxide solution. It is freed from copper by filtration, air is led for a short time through the red-brown liquid, and the leuco sulphuric ester formed is salted out from the yellow-red solution by adding 20 parts of potassium chloride in the form of its difficultly soluble potassium salt. It dyes cotton yellow shades by developing the dyeing in the usual manner with acid and sodium nitrite.

*Example 22*

19 parts of chlorsulphonic acid are allowed to drop into 300 parts of dry pyridine. Then a mixture of 4'-azo-2-phenyl-5.3-dichloranthraquinone (obtainable according to Example 4 or 8) and 14 parts of copper meal is added at 40° C. When all of the dyestuff has dissolved, the whole is poured into 1000 parts of ice water, the separated oily pyridine salt of the leuco sulphuric ester is dissolved in 500 parts of 5 per cent potassium hydroxide solution, filtered off from copper and, by adding 300 parts of potassium chloride, the ester is separated from the red-yellow filtrate. By developing the dyeing in an acid bath with sodium nitrite, brilliant yellow shades are obtained.

*Example 23*

10 parts of the dyestuff, obtainable according to Example 9, and 10 parts of copper meal are added to a mixture of 14 parts of chlorsulphonic acid and 300 parts of pyridine and stirred at 40° C., whereby the dyestuff slowly dissolves. Then the mixture is poured into ice water, the precipitated pyridine salt of the leuco sulphuric acid ester is treated with 400 parts of 5 per cent potassium hydroxide solution, filtered off from copper and the ester is salted out by adding 120 parts of potassium chloride. It dyes cotton after developing brilliant yellow shades.

*Example 24*

30 parts of the potassium salt of the leuco sulphuric ester of 4'-acetamino-2-phenylanthraquinone (obtainable from 4'-acetamino-2-phenylanthraquinone by treatment with copper powder and chlorsulphonic acid in pyridine) are dissolved in 300 parts of 3 per cent caustic potash solution; the solution is heated at from 80 to 90° C. for some time to saponify the acetylamino group. After cooling, a sodium hypochlorite solution having about 10 per cent of active chlorine is dropped in while stirring until potassium iodide starch paper becomes blue. The originally red-yellow liquid is then deep red. It is heated to 60° C. and potassium chloride is added whereby beautiful red-yellow needles separate. They are filtered off after some hours and washed with potassium hydroxide solution. The leuco sulphuric acid ester thus obtained conforms in its properties with the leuco sulphuric acid ester described in Example 19.

*Example 25*

30 parts of the leuco sulphuric acid ester of 4'-nitro-2-phenylanthraquinone (obtainable for example from 4'-nitro-2-phenylanthraquinone by treatment with copper powder and chlorsulphonic acid in pyridine) are dissolved in 1000 parts of 5 per cent caustic potash solution and an alkaline solution of stannous chloride is added until the color changes to brilliant red. Small amounts of precipitate are filtered off and 150 parts of potassium chloride are added at 50° C. whereby beautiful red-yellow needles separate which are entirely identical in properties to the leuco-tetrasulphuric acid ester obtained according to Example 19.

*Example 26*

For the purpose of dissolving 10 parts of the potassium salt of the leuco tetra-sulphuric acid ester of dianthraquinonylhydrazo-benzene of the formula

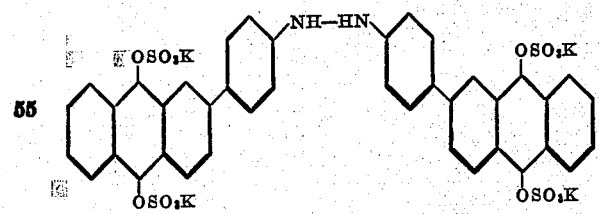

(obtainable for example from the potassium salt of the leuco tetrasulphuric acid ester obtained according to Example 19 by treatment with sodium hydrosulphite in alkaline solution at from 40 to 50° C.) in 200 parts of water, sodium hypochlorite solution having about 10 per cent of active chlorine is added until the color of the solution has changed from pale yellow to brilliant yellow-red and an excess of the oxidizing agent is detectable with potassium iodide starch paper. Upon the addition of potassium chloride, red-yellow needles separate which conform completely in their properties with the leuco tetrasulphuric acid ester described in Example 19.

Hydrogen peroxide or alkaline ferricyanides may also be used instead of hypochlorite solution.

*Example 27*

A solution of 8 parts of sodium nitrite in 40 parts of water is added to a solution of 30 parts of the potassium salt of the leuco sulphuric acid ester of 4'-amino-2-phenylanthraquinone in 1500 parts of water. The mixture is then acidified with acetic acid while cooling with ice. The diazo compound of the leuco sulphuric ester of 4'-amino-2-phenylanthraquinone thus obtained is then allowed to flow into 280 parts of a solution of cuprous oxide in ammonia (prepared from 35 parts of crystallized copper sulphate (cf. Liebig's Annalen, vol. 320, page 123)). The liquid is heated for a short time at from 40 to 50° C., whereby the leuco sulphuric ester of 4'-azo-2-phenylanthraquinone is formed. It is separated according to the manner described in Examples 24 to 26 with potassium chloride and is identical in its properties with that obtained according to Example 19.

If instead of the leuco sulphuric ester of 4'-amino-2-phenylanthraquinone the leuco sulphuric ester of the 4'-amino-2.6-diphenylanthraquinone (cf. Example 5) is used, a diphenyl derivative of the leuco sulphuric ester described in Examples 19 and 20 is obtained.

If employing the leuco sulphuric ester of 4'-amino-2-phenyl-5.8-dichloranthraquinone (yellow-red aqueous solution) an ester is obtained which conforms in its properties with the leuco sulphuric ester of Example 22.

What we claim is:

1. A vat dyestuff of the general formula

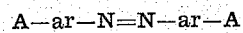

in which A's stand for the same anthraquinonyl radicles and ar for an arylene radicle having from one to two non-condensed rings.

2. A vat dyestuff of the general formula

in which A's stand for the same anthraquinonyl radicles.

3. The vat dyestuff of the formula

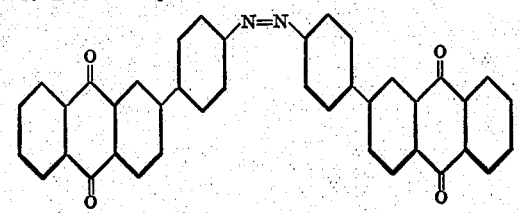

4. The vat dyestuff of the formula

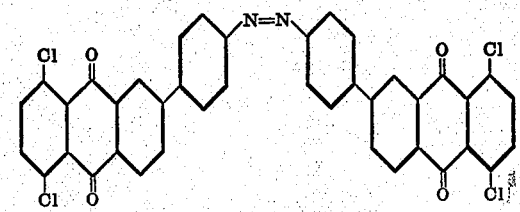

5. A leuco sulphuric ester of a vat dyestuff as claimed in claim 1.
6. A leuco sulphuric ester of a vat dyestuff as claimed in claim 2.
7. The leuco sulphuric ester of the vat dyestuff as claimed in claim 3.
8. The leuco sulphuric ester of the vat dyestuff as claimed in claim 4.

HEINRICH NERESHEIMER.
ERNST HONOLD.
BERTHOLD STEIN.
MAX SCHUBERT.
ERNST ANTON.